United States Patent [19]

Wooding et al.

[11] 4,091,229

[45] May 23, 1978

[54] SLAG AND ALLOY FEEDING BASED ON ELECTRODE WEIGHT

[75] Inventors: Patrick J. Wooding, Moorestown, N.J.; Edgar V. Weir, Butler, Pa.

[73] Assignee: Wooding Corporation, Moorestown, N.J.

[21] Appl. No.: 773,333

[22] Filed: Mar. 1, 1977

[51] Int. Cl.² .......................................... H05B 7/148
[52] U.S. Cl. ...................................... 13/33; 13/9 ES
[58] Field of Search ..................... 13/9, 9 ES, 12, 13, 13/33, 34

[56] References Cited

U.S. PATENT DOCUMENTS

| | | | |
|---|---|---|---|
| 2,709,842 | 6/1955 | Findlay | 13/33 X |
| 3,518,350 | 6/1970 | Lunig | 13/12 |
| 3,622,678 | 11/1971 | Allen | 13/13 |
| 3,634,592 | 1/1972 | Pantke et al. | 13/33 |
| 3,936,588 | 2/1976 | Asphaug et al. | 13/33 |

*Primary Examiner*—R. N. Envall, Jr.
*Attorney, Agent, or Firm*—Duffield & Lehrer

[57] ABSTRACT

Load cells continuously measure the weight of a consumable electrode as it is being melted in an electroslag melting furnace. This information is compared to similar information obtained from load cells measuring the weight of a supply of granular slag and/or alloy additions intended to be added to the molten slag in the furnace. The addition of the granular slag and/or alloy is controlled based on the results of this comparison.

3 Claims, 1 Drawing Figure

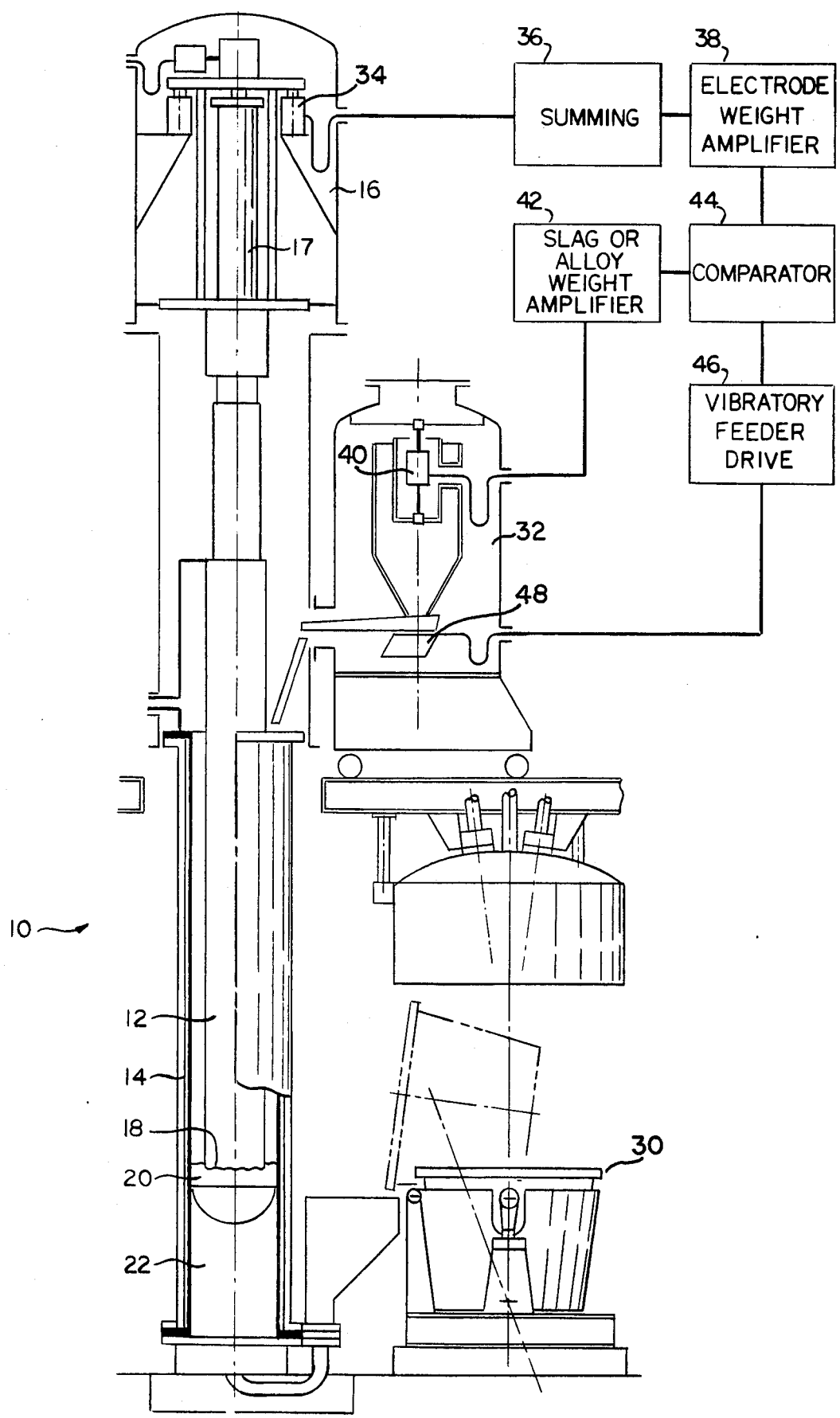

SLAG AND ALLOY FEEDING BASED ON ELECTRODE WEIGHT

BACKGROUND OF THE INVENTION

The present invention is directed toward a slag and alloy feeding system for use in electroslag melting furnaces and more particularly to a slag and allow feeding system which is based on the measured weight of the consumable electrode.

The electroslag melting process was first invented, developed and put into full production by R. F. Hopkins in Pittsburgh, Pennsylvania during the period between 1930 and 1960. This process employs a consumable electrode which is immersed in a pool of molten slag supported at the top of the resultant solidifying ingot enclosed within a cold-walled mold or crucible.

Alternating (or sometimes direct) current flows down the consumable electrode through the slag, down the ingot and back to the power supply. Preferably, the current flows back to the power supply in a coaxial manner to the top of the crucible such as shown in co-pending application Ser. No. 616,365, filed Sept. 24, 1975. This current, normally in the range of 1,000 amps per inch of ingot diameter, drops from fifteen to forty volts across the slag (or flux) pool thereby producing hundreds of kilowatts of melting power which consumes the tip of the electrode.

As a result of the foregoing, molten metal droplets form on the immersed electrode tip, detach themselves and fall through the molten flux pool to the ingot which is forming there below. As the metal droplets pass through the flux pool, they undergo chemical refinement. Progressive solidification of the ingot formed by this method leads to the physical isotropy and high yield associated with all consumable electrode processes.

Melting rates in the electroslag process are determined by the solidification characteristics of each alloy. However, as an average and for illustration purposes only, such rates are approximately 25 pounds per hour per inch of ingot diameter. Thus, a 24 inch diameter ingot of alloy steel might have an average melt rate of 600 pounds per hour. If this ingot has a typical height of 96 inches, its weight will be 6 tons and total melting time will, therefore, be approximately twenty hours.

As is known in the art, motion of the head of the electrode is the difference between the rate of burn-off of the electrode tip and the rate of build-up of the ingot being formed there below. In the preceding example, a twenty inch diameter electrode would typically be used and its consumable length would need to be greater than the ingot length in the inverse ratio of the squares of their diameter, assuming, of course, full density for both.

As is known in the art, for optimum thermal efficiency and best ingot surface, the ideal position of the electrode tip which is basically flat, provided the electrode to ingot "fill" or area ratio is kept above 0.6, is just immersed under the top surface of the molten flux pool.

However, molten flux in the slag pool is steadily consumed during melting and reappears as a thin (approximately 1/10 inch) skin on the outside surface of the ingot. The precise thickness of this slag skin, and therefore the precise rate of reduction of the slag pool height, is difficult to predict and is therefore difficult to compensate for exactly.

In the past, granular slag to make up these losses due to the formation of the ingot skin and any alloy additions that are required, have been made using batch or belt type timebased feeders. The accuracy of the addition by these prior art feeders was entirely a function of how close the operator of the system estimated the total melting time, and how closely the melt rate came to being constant. For example, the -ton 24 inch ingot discussed above would start with approximately 6 inches deep or 270 pounds of molten flux in the bottom of the crucible. If the ingot slag skin formed is one-tenth of an inch thick, then nine pounds of slag will be lost from the pool to the ingot skin for every foot of ingot height. This means that the slag pool will diminish by 72 pounds, or 27 percent in depth, by the end of the melt unless make-up slag is added during the melt.

As is also known in the art, normal production melting proceeds at a relatively high melt rate until the ingot is one diameter in height, then tapers off slowly in melt rate as the effect of stool cooling diminishes and then reduces relatively rapidly to the "hot-top" level required for a dense ingot head.

Because of the huge thermal time constants involved in the electroslag process, it is very difficult to relate actual melt rate to time at any given power level. As a result, a time-rate slag or alloy feeder is necessarily quite inaccurate. Normal practice with a time base feeder is to set a discharge rate of so many ounces or grams per minute, based on the total weight of slag or alloy required during the melt. The results may be, per inch of ingot, in error by as much as 50 percent, because time is not directly proportional to the amount of metal being melted when the melting power levels are changing.

The situation is even worse for alloy feeding. Assume, for example, that the 6 ton ingot discussed above arrived at the electroslag furnace at a weight of 12,080 pounds, requiring chemistry correction to add 0.1%, or a total of 12.08 pounds, of a critical alloy ingredient. Using the prior art batch weigh and dump feeder described above (belt weighing feeders are even less accurate) it is consistently possible to deliver, at a chute or vibratory feeder: $12.08 \times 16/20 \times 60 = 0.161$ ounces/minute for a period of 20 hours, with a weighing accuracy of better than 0.1%. However, if the total melt time precalculation is in error by half an hour, or 2.5%, which frequently happens, the time base feeder either delivers too much alloy, thereby starving the head of the ingot significantly or not enough alloy, thereby starving the whole ingot slightly.

More importantly, as the actual ingot weight builds up at different rates due to changes in melting current, the time based feeder continues to deliver 0.161 onces per minute. It will do this irrespective of the number of ounces actually required by the ingot to alloy it correctly. These built-in errors are largely, but by no means entirely, redistributed by the fly-wheel effect of the volume of molten metal in the head of the ingot.

SUMMARY OF THE INVENTION

The present invention overcomes the above-described problems with the prior art systems. This is accomplished in accordance with the principles of the invention by load cells which continuously measure the weight of the consumable electrode as it is being melted in the electroslag furnace. This information is compared with similar information obtained from load cells measuring the weight of the supply of granular slag and alloy additions intended to be added to the molten slag. The results of this comparison are then used to control the addition of the granular slag and alloy material.

BRIEF DESCRIPTION OF THE DRAWING

For the purpose of illustrating the present invention, there is shown in the accompanying drawing one form which is presently preferred; it being understood that the invention is not intended to be limited to the precise arrangements and instrumentalities shown.

The FIGURE is a section view showing the general arrangement of the various components of an electroslag melting system and a block diagram of the slag and alloy feeding control system of the present invention.

DETAILED DESCRIPTION OF THE INVENTION

Referring now to the drawing in detail, there is shown in the sole FIGURE a general plan view of an electroslag melting system generally designated as 10. The major components of the electroslag melting system 10 illustrated in the FIGURE are generally known in the art. These include, for example, a consumable electrode 12 which is suspended within a crucible 14. The furnace head 16 includes a ram 17 for moving the electrode downwardly into the crucible 14 so as to maintain the tip 18 of the electrode immersed in the slag pool 20 supported by the ingot 22 being formed there below.

Shown in the bottom right of the FIGURE is a premelting furnace including a crucible 30 which, as known in the art, is used to pour molten flux into the bottom of the crucible 14 for starting the electroslag operation. Located above the premelting furnace is a feeder 32 which is used to feed granular slag and/or alloy materials to the crucible 14 to replace the slag which is consumed during melting of the consumable electrode 12 as is more fully explained above.

In accordance with the principles of the present invention, and as is shown in the FIGURE, the weight of the electrode 12 is continuously measured by a plurality of load cells 34 located within the furnace head 16. The outputs of the load cells 34 are combined in the summing circuit 36 and the output of the summing circuit 36 is amplified by the electrode weight amplifier 38. The summing circuit 36 and electrode weight amplifier 38 may be, for example, a BLH 8000 weighing instrument or similar device. The weighing instrument is, of course, tare compensated so that only the weight of the consumable electrode 12 is being monitored.

Similarly, the output of a load cell 40 within the feeder 32 is fed to a slag or alloy weight amplifier 42. By way of example, weight amplifier 42 may be a BLH 5200 weighing instrument or similar device. This weighing instrument is also tare compensated so that only the weight of the charge material (the slag or alloy additions) in the feeder 32 is measured.

The output of amplifiers 38 and 42 are fed to a comparator circuit 44. Comparator circuit 44 compares the signals from amplifier 38 and amplifier 42 and generates an output signal whenever the output of amplifier 42 is greater than the output of amplifier 38. The outputs of amplifier 38 and amplifier 42 are, of course, first scaled to the same level so that the comparison can be made. In other words, the output of amplifier 38 might be scaled to a starting level of approximately 10 volts when first measuring the weight of the electrode 12 before it has begun to be melted, and the output of amplifier 42 would similarly be adjusted to a matching level of approximately 10 volts which would represent 100 percent or a full charge of slag and alloy material in the hopper 32. The output of comparator circuit 44 is fed to a vibratory feeder driver circuit 46 which drives vibrator 48 allowing material from the hopper 32 to be fed to the crucible 14.

It should be readily apparent from the above description that as the weight of the electrode 12 is reduced, comparator 44 will instruct vibratory feeder drive 46 to drive vibrator 48 thereby adding slag and/or alloy material to the crucible 14. Material will continuously be added until the scaled weight of the material remaining within the feeder 32 is equal to the scaled weight of the remaining electrode.

With the present weight based feeder system in use, the combined inherent accuracy of the load cell system weighing the electrode, and the load cell system weighing the slag or alloy, is directly applied to the function of delivering the slag or alloy material as tenths of ounces per pound of ingot built up. When all of the electrode has been melted, all of the slag or alloy has gone, automatically, and distribution from beginning to end of melt is accurate to approximately one percent.

It should be readily apparent that the above-described electrode weight based feed system can either be used independently or can be used in conjunction with a time based feed system. In other words, the above-described system can be used to supplement or to provide additional feeding whenever the electrode 12 is being melted at a faster rate than was contemplated when initiating the time based feed system. It should also be apparent that other features such as the ability to quick dump material from the feeder without affecting the operation of the automatic feed system can be incorporated if desired.

The present invention may be embodied in other specific forms without departing from the spirit or essential attributes thereof and, accordingly, reference should be made to the appended claims, rather than to the foregoing specification as indicating the scope of the invention.

We claim:

1. In an electroslag melting furnace system having a consumable electrode and a supply of additive material adapted to be supplied to the melting furnace as the electrode is being melted, the improvement comprising means for weighing said electrode as it is being melted and means for controlling the addition of said additive material in response to said weighing means.

2. The improvement as claimed in claim 1 further including means for weighing said additive material and means for comparing the weight of said additive material to the weight of said electrode.

3. The improvement as claimed in claim 2 wherein said means for controlling is responsive to said comparison means.